US009088322B2

(12) United States Patent
Koivisto et al.

(10) Patent No.: US 9,088,322 B2
(45) Date of Patent: Jul. 21, 2015

(54) CODEBOOK SUBSET RESTRICTION BASED ON CODEBOOK GROUPING

(75) Inventors: Tommi Koivisto, Espoo (FI); Mihai Enescu, Espoo (FI); Timo Roman, Espoo (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1100 days.

(21) Appl. No.: 12/751,588

(22) Filed: Mar. 31, 2010

(65) Prior Publication Data

US 2011/0243098 A1 Oct. 6, 2011

(51) Int. Cl.
| | |
|---|---|
| *H04B 7/216* | (2006.01) |
| *H04L 27/28* | (2006.01) |
| *H04L 27/06* | (2006.01) |
| *H04B 7/04* | (2006.01) |
| *H04B 7/06* | (2006.01) |

(52) U.S. Cl.
CPC ............ *H04B 7/0482* (2013.01); *H04B 7/0639* (2013.01); *H04B 7/0465* (2013.01); *H04B 7/0469* (2013.01); *H04B 7/0478* (2013.01)

(58) Field of Classification Search
USPC .......... 370/335, 342, 441, 479; 375/260, 340, 375/267
See application file for complete search history.

(56) References Cited

U.S. PATENT DOCUMENTS

| | | | | |
|---|---|---|---|---|
| 2008/0069054 | A1* | 3/2008 | Ho et al. ....................... | 370/335 |
| 2009/0041150 | A1* | 2/2009 | Tsai et al. ..................... | 375/267 |
| 2009/0268827 | A1* | 10/2009 | Clerckx et al. ................ | 375/260 |
| 2012/0039419 | A1* | 2/2012 | Maddah-Ali et al. ......... | 375/340 |

FOREIGN PATENT DOCUMENTS

| | | |
|---|---|---|
| EP | 2346189 A1 | 7/2011 |
| WO | 2009157715 A2 | 12/2009 |
| WO | 2011017991 A1 | 2/2011 |

OTHER PUBLICATIONS

Bishwarup Mondal, et al., "Rank-Independent Codebook Design from a Quaternary Alphabet," IEEE, 2007, pp. 297-301.
Pantech & Curitel, "Differential PMI Feedback for Overhead Reduction in LTE-A DL MIMO", 3GPP TSG-RAN WG1 #58, Aug. 24-28, 2009, pp. 1-5.
International Search Report international application No. PCT/IB2011/051393 dated December.
3GPP TSG RAN WG1 Meeting #59, R1-094616, "Signalling Aspects of Adaptable Codebooks," Alcatel-Lucent, Alcatel-Lucent Shanghai Bell, Jeju, Korea, Nov. 9-13, 2009, pp. 1-4.
3GPP TSG RAN WG1 Meeting #59, R1-094618, "Adaptable Codebooks for MU-MIMO," Alcatel-Lucent, Alcatel-Lucent Shanghai Bell, Jeju, Korea, Nov. 9-13, 2009, pp. 1-3.

(Continued)

*Primary Examiner* — Kiet G Tang
(74) *Attorney, Agent, or Firm* — Squire Patton Boggs (US) LLP

(57) ABSTRACT

A method and apparatus are provided for an apparatus. The apparatus includes at least one memory including computer program code, and at least one processor. The at least one memory and the computer program code are configured to, with the at least one processor, cause the apparatus at least to receive an indication of a set of codeword groups to be included in a codebook, and to select a precoding matrix index based on the indicated set of codeword groups in the codebook. The apparatus is also cause to transmit the precoding matrix index to a network node.

16 Claims, 4 Drawing Sheets

(56) References Cited

OTHER PUBLICATIONS

3GPP TSG RAN WG1 Meeting #59, R1-094695, "Extension to Rel. 8 PMI feedback by adaptive codebook," Jeju, Korea, Nov. 9-13, 2009, pp. 1-4.

3GPP TS 36.300 V9.0.0 (Jun. 2009), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 9), Jun. 2009, pp. 1-157, 3GPP, Valbonne, France.

3GPP TS 36.213 V8.8.0 (Sep. 2009), Technical Specification, 3rd Generation Partnership Project; Technical Specification Group Radio Access Network; Evolved Universal Terrestrial Radio Access (E-UTRA); Physical layer procedures, (Release 8), Sep. 2009, pp. 1-77, 3GPP, Valbonne, France.

3GPP TS 36.211 V9.0.0 (Dec. 2009), Technical Specification, 3rd Generation Partnership Project; Technical Specification Group Radio Access Network; Evolved Universal Terrestrial Radio Access (E-UTRA); Physical Channels and Modulation, (Release 9), Dec. 2009, pp. 1-85, 3GPP, Valbonne, France.

\* cited by examiner

CODEBOOK SUBSET RESTRICTION BASED ON CODEBOOK GROUPING

BACKGROUND

1. Field

Embodiments of the invention generally relate to communications networks and particularly to wireless communications networks, for example, the Universal Mobile Telecommunications System (UMTS), the Universal Terrestrial Radio Access Network (UTRAN), Long Term Evolution (LTE), and Evolved UTRAN (E-UTRAN). More particularly, certain embodiments of the invention relate to methods, apparatuses, computer programs products, and a system for a codebook subset restriction based on codebook groupings for antenna support in LTE systems.

2. Description of Related Art

UTRAN refers to a communications network including base stations, or Node-Bs, and radio network controllers (RNC). UTRAN allows for connectivity between a user equipment (UE) and a core network (CN). The RNC provides control functionalities for one or more Node Bs. The RNC and its corresponding Node Bs are called the Radio Network Subsystem (RNS).

LTE refers to improvements of the UMTS through improved efficiency and services, lower costs, and use of new spectrum opportunities. In particular, LTE is a 3GPP standard that provides for uplink (UL) peak rates of at least 50 megabits per second (Mbps) and downlink (DL) peak rates of at least 100 Mbps. LTE supports scalable carrier bandwidths from 20 MHz down to 1.4 MHz and supports both Frequency Division Duplexing (FDD) and Time Division Duplexing (TDD).

LTE is also expected to improve spectral efficiency in communications networks, for example, 3G networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

SUMMARY

In accordance with an embodiment of the invention, there is provided an apparatus. The apparatus includes at least one processor, and at least one memory including computer program code. The at least one memory and the computer program code are configured to, with the at least one processor, cause the apparatus at least to receive an indication of a set of codeword groups to be included in a codebook and to select a precoding matrix index based on the indicated set of codeword groups in the codebook. The apparatus may also be caused to transmit the precoding matrix index to a network node.

In accordance with another embodiments of the invention, there is provided a method. The method includes receiving a an indication of a set of codeword groups to be included in a codebook. Further, the method includes selecting a precoding matrix index based on the indicated set of codeword groups in the codebook. The method further includes transmitting the precoding matrix index to a network node.

In accordance with an embodiment of the invention, there is provided an apparatus. The apparatus includes at least one processor, and at least one memory including computer program code. The at least one memory and the computer program code are configured to, with the at least one processor, cause the apparatus at least to generate an indication of a set of codeword groups to be included in a codebook, and to transmit the indication of the set of codeword groups to be included in the codebook to a node. The apparatus is also caused to receive a precoding matrix index from the node based on the indicated set of codeword groups in the codebook In accordance with another embodiments of the invention, there is provided a method. The method includes generating an indication of a set of codeword groups to be included in a codebook, and transmitting the indication of the set of codeword groups to be included in the codebook to a node. The method further includes receiving a precoding matrix index from the node based on the indicated set of codeword groups in the codebook.

A computer program product embodied on a computer readable storage medium. The computer program product being encoded with instructions to control a processor to perform a process. The process includes receiving a an indication of a set of codeword groups to be included in a codebook. Further, the process includes selecting a precoding matrix index based on the indicated set of codeword groups in the codebook. The method further includes transmitting the precoding matrix index to a network node.

A computer program product embodied on a computer readable storage medium. The computer program product being encoded with instructions to control a processor to perform a process. The process includes generating an indication of a set of codeword groups to be included in a codebook, and transmitting the indication of the set of codeword groups to be included in the codebook to a node. The process further includes receiving a precoding matrix index from the node based on the indicated set of codeword groups in the codebook.

BRIEF DESCRIPTION OF THE DRAWINGS

Reference will now be made in detail to the embodiments of the invention, examples of which are illustrated in the accompanying drawings

DETAILED DESCRIPTION

Figure 1:
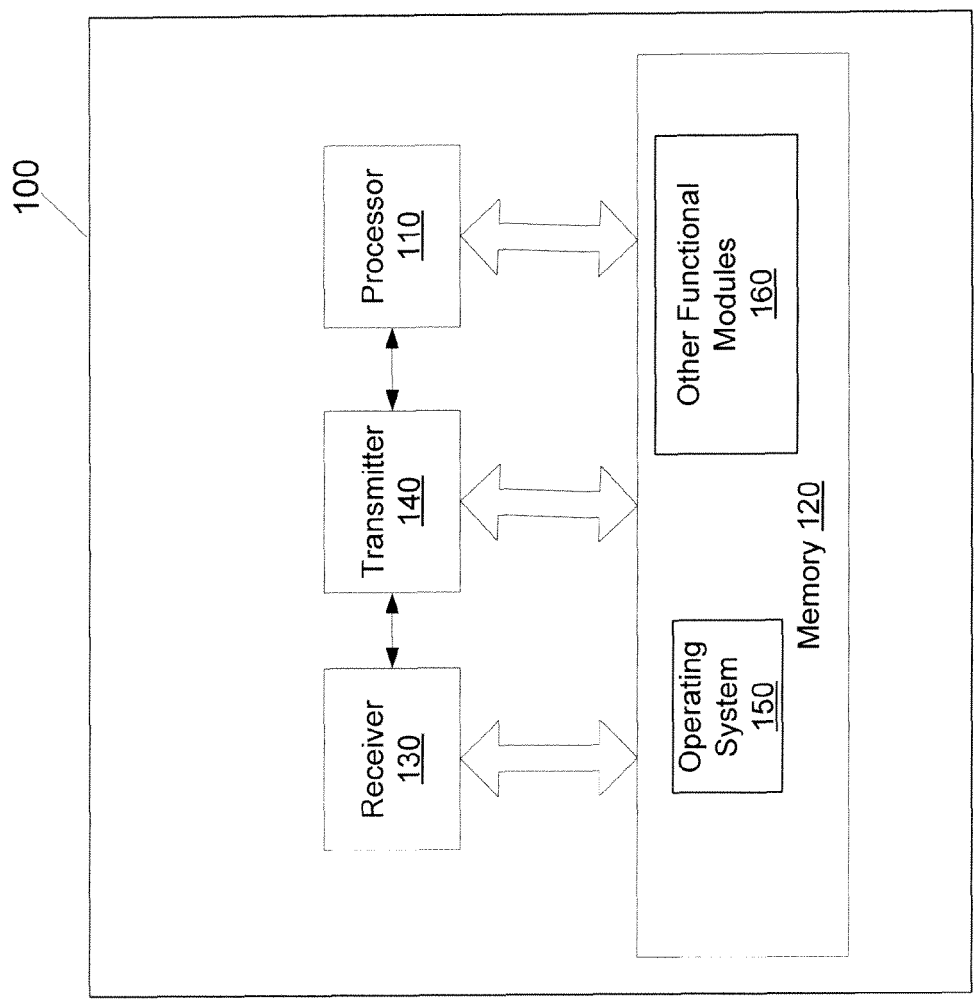
FIG. 1 illustrates an apparatus, in accordance with an embodiment of the invention.

It will be readily understood that the components of the invention, as generally described and illustrated in the figures herein, may be arranged and designed in a wide variety of different configurations. Thus, the following detailed description of the embodiments of methods, apparatuses, computer program products, and a system, as represented in the attached figures, is not intended to limit the scope of the invention as claimed, but is merely representative of selected embodiments of the invention.

Certain embodiments of the invention combine hardware and software components to create methods, apparatuses, computer program products, and a system for a codebook subset restriction based on codebook groupings for antenna support in LTE systems. More particularly, certain embodiments of the invention provide methods, apparatuses, computer program products, and a system for a codebook subset restriction based on codebook groupings for supporting any antenna array size and/or configuration, for example, 8 Tx antennas in a LTE system, and specifically a codebook subset restriction based on codebook groupings for any antenna array size and/or configuration, for example, different setups for the 8 Tx antennas.

LTE includes a set of enhancements to the UMTS which is included in the yet to be ratified $3^{rd}$ Generation Partnership Project (3GPP) Release 9 (3GPP Release 9, Technical Specification 36.300 "Group Radio Access Network, Evolved Universal Terrestrial Radio Network (E-UTRAN), and Evolved Universal Terrestrial Radio Access Network (E-UTRAN)). 3GPP is currently studying potential enhancements to Release 9 LTE in order to specify a new system called LTE-Advanced (LTE-A), which fulfills the international mobile telecommunications (IMT)-Advanced requirements set by the International Telecommunications Union Radiocommunication Sector (ITU-R). Topics within the ongoing study item include, for example, bandwidth extensions beyond 20 MHz, relays, UL single-user multiple input multiple output (MIMO), cooperative MIMO, and other DL MIMO enhancements including enhancements to multi-user MIMO. For DL MIMO, LTE-A will also support up to 8 Tx antennas instead of only up to 4 supported Tx antennas, as currently provided for in 3GPP Release 9 LTE, for example, TS 36.300, TS 36.213, and TS 36.211.

In December 2009, the Release 10 Work Item Description for enhanced DL MIMO was approved at the 3GPP radio access network (RAN) plenary meeting. As a result, actual specifications for the DL MIMO including support for closed-loop operation over 8 Tx antennas will be created, allowing the transmission of up to eight spatial layers.

Currently, closed-loop MIMO transmission may be based on the UE feeding back preferred transmit precoders, or precoding codewords, based on channel estimates, e.g., the UE may report on an UL channel precoding codewords that may maximize a DL throughput, if applied as a DL precoder at the base station. A network node, for example, an e-UTRAN Node B (eNB), may then precode the transmissions utilizing the recommended codewords. The precoding codewords, also referred to as a precoding matrix index (PMI), may be chosen by the UE from a pre-defined codebook by reviewing each entry and measuring a resulting throughput or another performance measure, for example, a received signal energy.

As defined, for example, in 3GPP Release 8 LTE, for example, TS 36.211, a 2-bit codebook (i.e., having 4 entries) may be used for 2 Tx antennas, and a 4-bit codebook (i.e., having 16 entries) may be used for 4 Tx antennas. It is likely that the codebook for 8 Tx antennas will contain a 16 to 64 entries, corresponding to 4-bit to 6-bit codebooks, respectively, depending on the final size (number of elements) considered to offer the best tradeoff between DL performance and UL reporting overhead.

An optimum design of codebook entries (e.g., codewords), for example, may be dependent on an antenna setup. For example, for diversity antenna setup where a spatial transmit correlation can be considered to be very low, the optimum design may require more bits than, for example, for beamforming antenna setup where the antennas are very closely spaced and spatial correlation is high. Additionally, the codewords themselves tend to be very different. Different codebook entries can be tailored for different transmission scenarios, meaning essentially different antenna configurations at the base station such as for instance a Uniform Linear Array (ULA), or for example, cross-polarized antennas. One could design the codebook so that all codewords for all scenarios are included, however this design may include a very large codebook containing a lot of entries. The number of entries in this codebook may lead to high UE computational complexity in PMI selection, high UL overhead in PMI reporting, and high control DL signaling overhead, if wideband PMI is explicitly signaled over a physical DL control channel (PDCCH).

However, to allow different antenna array implementations, the codebook should efficiently support as many different antenna setups as possible. Hence, current codebooks cause a conflict between UE computational complexity, UL overhead, and efficient support of radically different antenna setups.

In recent 3GPP RAN working group (WG1) meetings, several different proposals have been presented to overcome the problems discussed above with current codebooks in support of antenna setup.

For example, an adaptive codebook, as discussed, for example, by Huawei, in the 3GPP TSG RAN WG1 meeting #59, entitled, "*Extension to Rel. 8 PMI Feedback by Adaptive Codebook*," R1-094695 (Nov. 9-13, 2009), has been developed. For an adaptive codebook, long term spatial covariance is used to transform a channel at the UE side, after which, for example, a codebook designed for an independent and identically distributed (IID), or uncorrelated, channel may be effectively utilized. The channel may be transformed so that statistics of the transformed channel may be such that the utilized codebook is nearly optimal. However, the long-term spatial covariance needs to be computed and signaled between eNB and UE. The spatial covariance is very difficult to efficiently quantize. Furthermore, with this approach the UE would need to transform the channel at the UE side before computing each PMI which increases computational complexity. Finally, since there are still only a limited number of possible antenna setups, this approach may result in unnecessary additional costs and overhead associated with the computational complexity Another approach for implementing different antenna arrays has been discussed, for example, by Alcatel-Lucent in the 3GPP TSG RAN WG1 meeting #59, entitled, "*Adaptable Codebooks for MU-MIMO*," R1-094618 (Nov. 9-13, 2009). This approach includes a downloadable codebook which may be utilized, for example, in the existing 3GPP2 UMB standard. The downloadable codebook approach provides that the UE obtains the codebook from the eNB either with broadcast or dedicated signaling. While the downloadable codebook approach eliminates all the codebook limitations, this approach fails to provide the capability for defining a network/eNB/cell-specific codebook from the perspective of the UE.

Typically, codebooks have certain structure, for example, the alphabet used to construct the codebook may be restricted, codeword entries may have constant modulus, or the codebook may have the so-called nested property. All these features help reduce UE computational complexity in PMI and/or rank selection. If the eNB is given the freedom to define the used codebook, one can no longer assume anything about the codebook structure in the UE implementation, hence the UE codeword computations need to be implemented based on the worst case assumption in terms of complexity. Another notable drawback is the huge DL signaling overhead associated with the downloadable codebook, as every UE would need to download the codebook entries before the actual transmission takes place.

Alcatel-Lucent has discussed additional approaches to adaptable codebooks in the 3GPP TSG RAN WG1 meeting

59, entitled, "Signaling Aspects of Adaptable Codebooks," R1-094616 (Nov. 9-13, 2009).

Codebook subset restriction has also been discussed, for example, in 3GPP Release 8 LTE, for example, TS 36.213 v.8.8.0 section 7.2. For codebook subset restriction, signaling from the eNB to the UE provides codeword indices from the full codebook that the UE uses for reporting. For example, as described in 3GPP TS 36.213 v.8.8.0 section 7.2, a bitmap can be signaled to the UE to indicate exactly which codeword indices should be utilized. Obviously, large bitmaps may be needed for signaling the selection of codewords within the codebook to the UE. For example, in Release 8 LTE, for example, TS 36.213 v.8.8.0 section 7.2, the largest bitmap is 64 bits for pointing to 16 codeword entries separately with all possible transmission ranks 1-4. Codebook subset restriction provides more freedom in the signaling than what may be required, since this approach addresses individual codebook entries. Hence, the signaling overhead may be unnecessarily high, especially considering the extension to 64 entries and up to rank 8, i.e., 8×64 or 512 bits with full codebook subset restriction signaling.

Structuring a precoding codebook so that precoding vectors are grouped into unitary matrices has been discussed, for example, by B. Mondal, T. A. Thomas, and M. Harrison, in "Rank-Independent Codebook Design from a Quaternary Alphabet," in Proc. 41$^{st}$ Asilomar conference on Signals, Systems and Computers, November 2007. As discussed by Mondal, et al., for example, a codebook consisting of 64 rank-1 vectors can be grouped into eight groups of eight precoding vectors. The vectors within one group are orthogonal; hence they may form a unitary matrix.

Embodiments of the invention provide methods, apparatuses, computer program products, and a system for a codebook subset restriction based on codebook groupings for antenna support in LTE systems. For certain embodiments of the invention, for a rank>1 PMI, columns of a reported codeword (e.g., PMI) may be orthogonal. Accordingly, having full freedom in selecting the codewords to be included in the codebook may be redundant, since the PMIs need to contain any orthogonal directions corresponding to a given vector. Hence, for a given vector, some additional orthogonal vectors may be included in the codebook.

Embodiments of the invention further provide a codebook that may be constructed from a plurality of codeword groups. Each codeword group may be configured as a unitary matrix, i.e., the codewords may be orthogonal within a codeword group. Furthermore, at least one codeword group may be defined per supported antenna setup. The total number of possible codeword groups may be larger than the number of codeword groups that can fit within a codebook selected for transmission. Based on the deployed antenna setup, the eNB may be configured to signal to the UE which codeword groups are included in the codebook to be used for transmission and reporting by the UE.

Hence, the codebook, according to certain embodiments of the invention, provides a codebook with a grouped structure. Furthermore, certain embodiments of the invention define codeword groups for each relevant antenna setup and further indicate through signaling from the eNB to the UE which of the codeword groups should be included in the codebook. For instance, two groups of rank 1 codewords specifically designed for 8 Tx cross-polarized antenna configuration are depicted below:

$$\begin{bmatrix} 1 & 1 & 1 & 1 & 1 & 1 & 1 & 1 \\ 1 & 1 & 1 & 1 & -1 & -1 & -1 & -1 \\ 1 & -j & -1 & j & 1 & -j & -1 & j \\ -j & -1 & j & 1 & j & 1 & -j & -1 \\ 1 & -1 & 1 & -1 & 1 & -1 & 1 & -1 \\ -1 & 1 & -1 & 1 & 1 & -1 & 1 & -1 \\ 1 & j & -1 & -j & 1 & j & -1 & -j \\ j & -1 & -j & 1 & -j & 1 & j & -1 \end{bmatrix}$$

$$\begin{bmatrix} 1 & 1 & 1 & 1 & 1 & 1 & 1 & 1 \\ j & j & j & j & -j & -j & -j & -j \\ 1 & -j & -1 & j & 1 & -j & -1 & j \\ 1 & -j & -1 & j & -1 & j & 1 & -j \\ 1 & -1 & 1 & -1 & 1 & -1 & 1 & -1 \\ -j & j & -j & j & j & -j & j & -j \\ 1 & j & -1 & -j & 1 & j & -1 & -j \\ -1 & -j & 1 & j & 1 & j & -1 & -j \end{bmatrix}$$

Each group forms a unitary matrix of size 8 times 8, which includes eight rank 1 precoding vectors as column vectors.

Thus, embodiments of the invention provide non-obvious advantages in that support for different antenna setups, for example, in case of 8 Tx antennas, is possible with significantly reduced signaling overhead when compared to traditional codebook subset restriction mechanisms. For example, certain embodiments of the invention may reduce the signaling overhead to 10-20 bits depending on the number of included codeword groups as compared to 8×64 or 512 bits with full codebook subset restriction signaling.

In an embodiment of the invention, there is provided an apparatus 100 for supporting antenna setup, as illustrated in FIG. 1. The apparatus 100 may include a processor 110 for processing information and executing instructions or operations. The processor 110 may be any type of general or specific purpose processor. While a single processor 110 is shown in FIG. 1, multiple processors may be utilized according to other embodiments.

The apparatus 100 may further include a memory 120, coupled to the processor 110, for storing information and instructions to be executed by the processor 110. The memory 120 may include any combination of random access memory ("RAM"), read only memory ("ROM"), static storage, such as a magnetic or optical disk, or any other type of machine or computer readable storage medium.

The apparatus 100 may further include a receiver 130 for receiving information including data and/or control signals, and a transmitter 140 for transmitting information, such as data and/or control signals. In some examples, the receiver and transmitter functionality may be implemented in a single transceiver unit.

In an embodiment of the invention, the memory 120 stores modules that provide functionality when executed by the processor 110. The modules may include an operating system 150. The memory 120 may also store one or more functional modules 160, such as an application or program, to provide additional functionality for the apparatus 100. The components of the apparatus 100 may be implemented solely in hardware, or any suitable combination of hardware and software.

The memory 120 and a computer program product or code stored thereon may be configured, with the processor 110, to cause the apparatus 100 to receive an indication of a set of codeword groups to be included in a codebook. The set of codeword groups to be included in the codebook may include a plurality, $N_{IID}$, of codeword groups intended for uncorrelated/diversity antenna setup, for example, $C_1, C_2, \ldots C_{iN\_IID}$ (where $C_i=C_{i1}\ldots C_{i8}$ in the case of 8 Tx antennas, where $C_{ij}$ is a precoding (column) vector of size $N_{Tx}$ times 1, $N_{Tx}$ being equal to 8 in the case of 8 Tx). The set of codeword groups may further include $N_{XPOL}$ codeword groups for cross-polarized antenna setup ($C_{N\_IID+1}, \ldots C_{N\_IID+N\_XPOL}$), and may further include $N_{ULA}$ codeword groups for uniform linear array (ULA) antenna setup ($C_{N\_IID+N\_XPOL+1}, \ldots C_N$, where $N=N_{IID}+N_{XPOL}+N_{ULA}$ is the total number of codeword groups). The antenna setup requirement may be based on the number and type of antenna ports on a transmitter side. The indication of the set of codeword groups to be used in the codebook may be received from a network node, for example, an eNB. Each of the codeword groups may form a unitary matrix. Embodiments of the invention contemplate other codeword groups and the ordering of these codeword groups that may be developed, for example, in 3GPP Release 9 and for other future standards. The indicated set of codeword groups may be included in a codebook that the UE may use for PMI reporting, or may form a distinct codebook for a specific antenna setup.

The apparatus 100 may further be configured to receive the indication of the set of codeword groups to be used in the codebook, for example, via broadcast signaling in system information or via a dedicated radio resource control (RRC) signaling, when configuring the apparatus 100 for PMI reporting.

The apparatus 100 may further be configured to select, using the processor 110, a PMI based on the indicated set of codeword groups in the codebook received from the eNB.

The apparatus 100 may further be configured to transmit, using the transmitter 140, the PMI to the eNB to enable the eNB to perform precoding, link adaptation, and single/multi-user scheduling for the Tx antennas.

In accordance with an embodiment of the invention, the apparatus may be configured to transmit, using the transmitter 140, to the network node a request for a set of codeword groups to be included in the codebook. In this embodiment, the transmission may be carried out via a dedicated RRC signaling to the network node.

According to some embodiments, the apparatus 100 may be a UE, a MS, or a terminal, such as a mobile telephone, a smart phone, a personal data assistant (PDA), a laptop, a netbook, or any other device capable of wireless communication.

Figure 2:
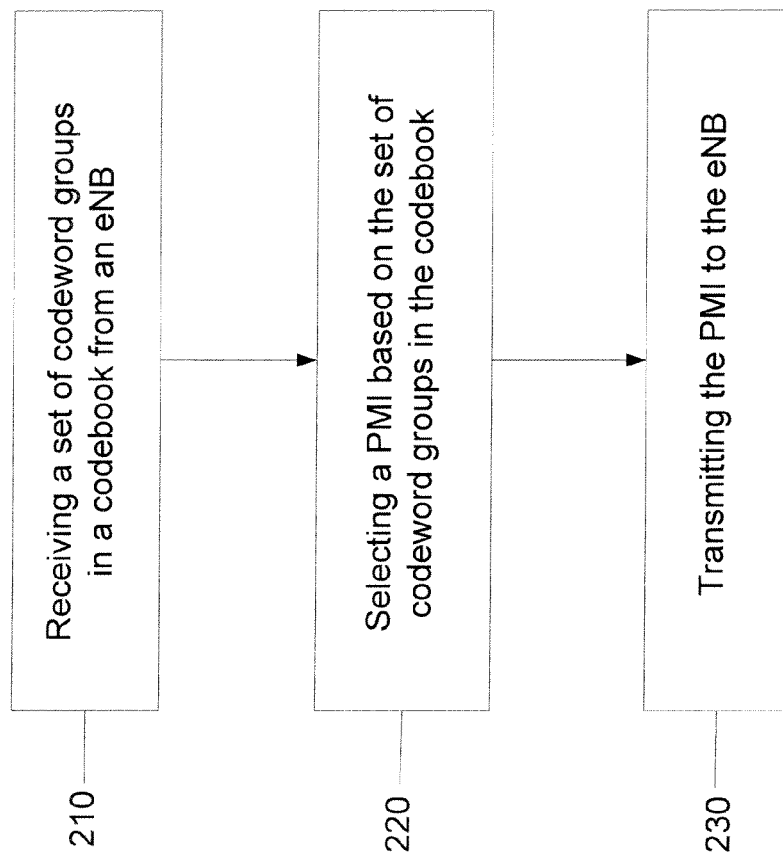
FIG. 2 illustrates a method, in accordance with an embodiment of the invention.

FIG. 2 illustrates a method for supporting antenna setup, in accordance with an embodiment of the invention. The method may include receiving, by the receiver 130, a an indication of a set of codeword groups to be included in a codebook (step 210). The indication of the set of codeword groups to be included in the codebook may include a plurality, $N_{IID}$, of codeword groups intended for uncorrelated/diversity antenna setup, for example, $C_1, C_2, \ldots C_{iN\_IID}$ (where $C_i=C_{i1}\ldots C_{i8}$ in the case of 8 Tx antennas, where $C_{ij}$ is a precoding (column) vector of size $N_{Tx}$ times 1, $N_{Tx}$ being equal to 8 in the case of 8 Tx). The set of codeword groups may further include $N_{XPOL}$ codeword groups for cross-polarized antenna setup ($C_{N\_IID+1}, C_{N\_IID+N\_XPOL}$), and may further include $N_{ULA}$ codeword groups for uniform linear array (ULA) antenna setup ($C_{N\_IID+N\_XPOL+1}, \ldots C_N$, where $N=N_{IID}+N_{XPOL}+N_{ULA}$ is the total number of codeword groups). The antenna setup requirement may be based on the number and type of antenna ports on a transmitter side. Each of the codeword groups may form a unitary matrix. Embodiments of the invention contemplate other codeword groups and the ordering of these codeword groups that may be developed, for example, in 3GPP Release 9 and for other future standards. The indicated set of codeword groups may be included in a codebook that the UE may use for PMI reporting, or may form a distinct codebook for a specific antenna setup.

The step of receiving may further include receiving the indication of the set of codeword groups to be used in the codebook from a network node (e.g., an eNB), for example, via broadcast signaling in system information or via a dedicated RRC signaling for reporting a PMI.

The method may further include selecting, using the processor 110, a PMI based on the indicated set of codeword groups in the codebook received from the network node (step 220).

The method may further include transmitting, using the transmitter 140, the PMI to the eNB to enable the eNB to perform precoding, link adaptation, and single/multi-user scheduling for the Tx antennas.

In accordance with an embodiment of the invention, the method may include transmitting to the network node a request for a set of codeword groups to be included in the codebook. In this embodiment, the step of transmitting may be carried out via a dedicated RRC signaling to the network node.

Figure 3:
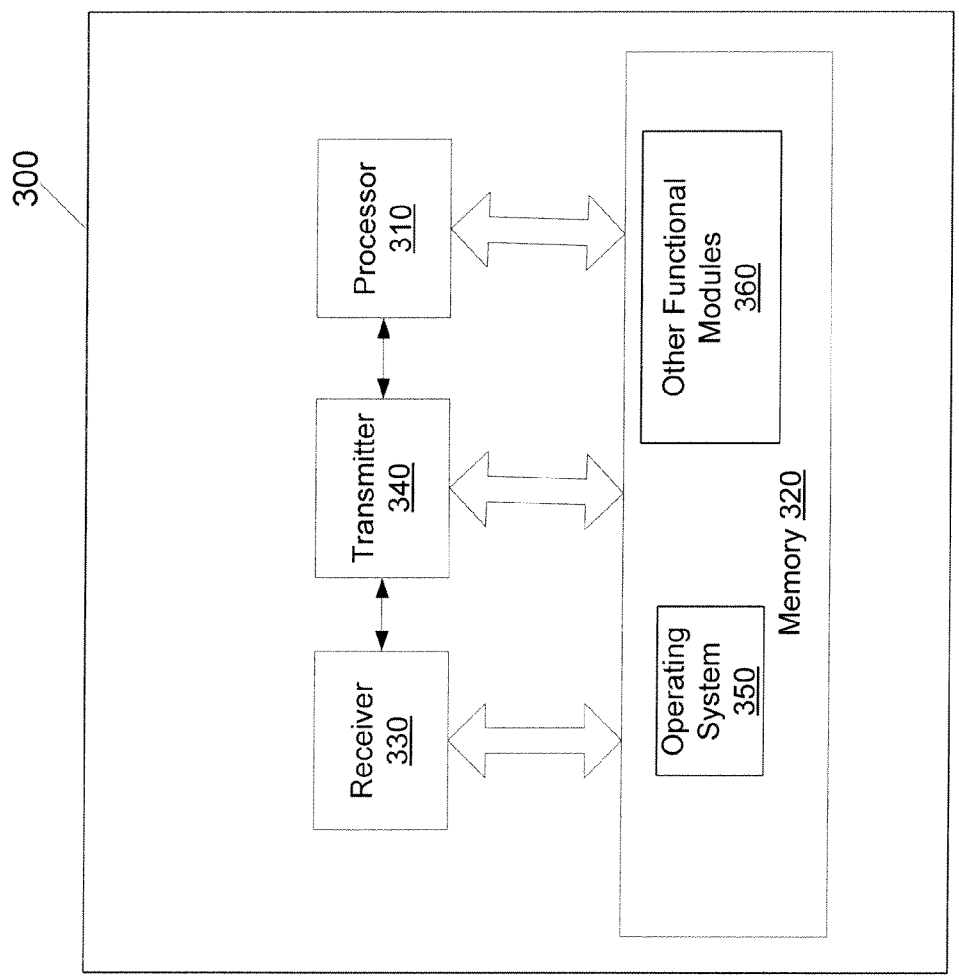
FIG. 3 illustrates another apparatus, in accordance with an embodiment of the invention.

FIG. 3 illustrates another apparatus, in accordance with an embodiment of the invention. The apparatus 300 may include a processor 310 for processing information and executing instructions or operations. The processor 310 may be any type of general or specific purpose processor. While a single processor 310 is illustrated in FIG. 3, multiple processors may be utilized according to other embodiments.

The apparatus 300 may further include a memory 320, coupled to the processor 310, for storing information and instructions to be executed by the processor 310. The memory 320 may include any combination of random access memory ("RAM"), read only memory ("ROM"), static storage, such as a magnetic or optical disk, or any other type of machine or computer readable storage medium.

The apparatus 300 may further include a receiver 330 for receiving information including data and/or control signals, and a transmitter 340 for transmitting information, such as data and/or control signals. In some examples, the receiver and transmitter functionality may be implemented in a single transceiver unit.

In an embodiment of the invention, the memory 320 stores modules that provide functionality when executed by the processor 310. The modules may include an operating system 350. The memory 320 may also store one or more functional modules 360, such as an application or program, to provide additional functionality for the apparatus 300. The components of the apparatus 300 may be implemented solely in hardware, or any suitable combination of hardware and software.

The memory 320 and a computer program product or code stored thereon may be configured, with the processor 310, to cause the apparatus 300 to generate an indication of a set of codeword groups to be included in a codebook. The indication of the set of codeword groups to be included in the codebook may include a plurality, $N_{IID}$, of codeword groups intended for uncorrelated/diversity antenna setup, for example, $C_1, C_2, \ldots C_{iN\_IID}$ (where $C_i=C_{i1}\ldots C_{i8}$ in the case of 8 Tx antennas, where $C_{ij}$ is a precoding (column) vector of size $N_{Tx}$ times 1, $N_{Tx}$ being equal to 8 in the case of 8 Tx). The set of codeword groups may further include $N_{XPOL}$ codeword groups for cross-polarized antenna setup ($C_{N\_IID+1}, \ldots C_{N\_IID+N\_XPOL}$), and may further include $N_{ULA}$ codeword groups for uniform linear array (ULA) antenna setup ($C_{N\_IID+N\_XPOL+1}, \ldots C_N$, where $N=N_{IID}+N_{XPOL}+N_{ULA}$ is the total number of codeword groups). The antenna setup requirement may be based on the number and type of antenna ports on a transmitter side. Each of the codeword groups may form a unitary matrix. Embodiments of the invention contemplate other codeword groups, and the ordering of these codeword groups that may be developed, for example, in 3GPP Release 9 and for other future standards. The indicated set of codeword groups may be included in a codebook that a UE may use for PMI reporting, or may form a distinct codebook for a specific antenna setup.

The apparatus 300 may further be configured to transmit, using the transmitter 340, the indication of the set of codeword groups to be included in the codebook, for example, via broadcast signaling in system information or via a dedicated radio resource control (RRC) signaling, when configuring the UE for PMI reporting.

The apparatus 300 may further be configured to receive, using the receiver 330, a PMI that is selected based on the indicated set of codeword groups in the codebook. The received PMI may enable the apparatus 300 to perform precoding, link adaptation, and single/multi-user scheduling for the Tx antennas.

In accordance with an embodiment of the invention, the apparatus may be configured to, using the receiver 330, receive a request for a set of codeword groups to be included in the codebook from the UE. In this embodiment, the request may be received via a dedicated RRC signaling from the UE.

Figure 4:
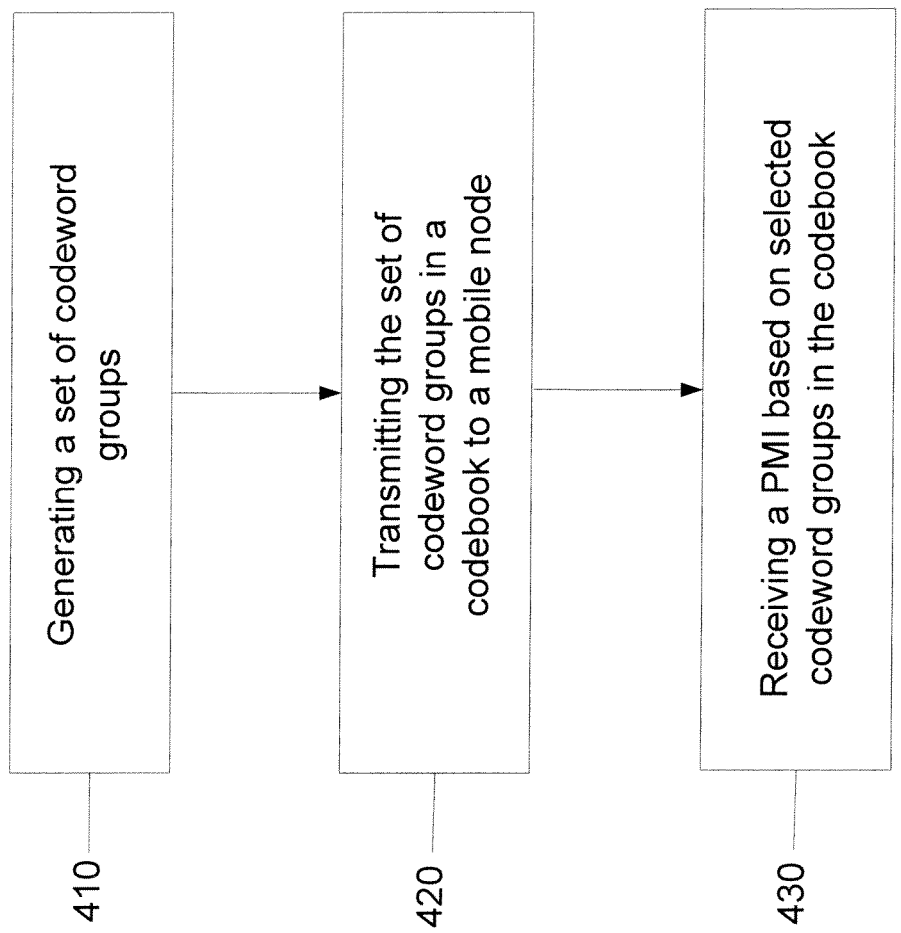
FIG. 4 illustrates another method, in accordance with an embodiment of the invention.

FIG. 4 illustrates another method for supporting antenna setup, in accordance with an embodiment of the invention. The method may include generating an indication of a set of codeword groups to be included in a codebook, using the processor 310, (step 410). The indication of the set of codeword groups to be included in the codebook may include a plurality, $N_{M}$, of codeword groups intended for uncorrelated/diversity antenna setup, for example, $C_1, C_2, \ldots C_{iN\_IID}$ (where $C_i=C_{i1} \ldots C_{i8}$ in the case of 8 Tx antennas, where $C_{ij}$ is a precoding (column) vector of size $N_{Tx}$ times 1, $N_{Tx}$ being equal to 8 in the case of 8 Tx). The set of codeword groups may further include $N_{XPOL}$ codeword groups for cross-polarized antenna setup ($C_{N\_IID+1}, \ldots C_{N\_IID+N\_XPOL}$), and may further include $N_{ULA}$ codeword groups for uniform linear array (ULA) antenna setup ($C_{N\_IID+N\_XPOL+1}, \ldots C_N$, where $N=N_{IID}+N_{XPOL}+N_{ULA}$ is the total number of codeword groups). The antenna setup requirement may be based on the number and type of antenna ports on a transmitter side. Each of the codeword groups may form a unitary matrix. Embodiments of the invention contemplate other codeword groups and the ordering of these codeword groups that may be developed, for example, in 3GPP Release 9 and for other future standards. The indicated set of codeword groups may be included in a codebook that a UE may use for PMI reporting, or may form a distinct codebook for a specific antenna setup.

The method may further include transmitting, using the transmitter 340, the indication of the set of codeword groups to be included in the codebook to a mobile node (e.g., a UE), for example, via broadcast signaling in system information or via a dedicated radio resource control (RRC) signaling, when configuring the UE for PMI reporting (step 420).

The method may further include receiving, using the receiver 330, a PMI that is selected based on the indicated set of codeword groups in the codebook. The received PMI may enable the apparatus 300 to perform precoding, link adaptation, and single/multi-user scheduling for the Tx antennas (step 430).

In accordance with an embodiment of the invention, the method may include receiving a request for a set of codeword groups to be included in the codebook from the UE. In this embodiment, the request may be received via a dedicated RRC signaling from the UE.

It is to be understood that in an embodiment of the invention, the steps and the like may be changed without departing from the spirit and scope of the present invention. In addition, the methods described in FIGS. 2 and 4 may be repeated as many times as needed.

The methods of FIGS. 2 and 4 can be performed by a processor or multiple processors instructed by a computer program product(s) embodied on one or more memory devices. The processor may be an application specific integrated circuit or it may be a general purpose central processing unit (CPU). The processor of a UE may be configured to perform the methods of FIGS. 2 and 4. The computer program product may be transmitted to the processor, directly loaded onto the processor, or may be stored in non-transient memory. The memory, including non-transient memory, may be memory onboard the processor, or may be a separate random access memory (RAM) or other suitable storage device.

The computer program product may be composed of modules that are in operative communication with one another, and which are designed to pass information or instructions to a communications device, such as the UE, a personal computer, or handheld device, such as a mobile telephone or personal digital assistant, or their equivalents. The computer program product may be configured to operate on a general purpose computer or an application specific integrated circuit (ASIC).

The computer-readable storage medium may include, for example, a disk media, computer memory, or other storage device.

Accordingly, certain embodiments of the invention provide non-obvious advantages over conventional codebook subset restriction and adaptable codebook methods. For example, certain embodiments of the invention provide a very low signaling overhead as compared to convention codebook subset restriction and adaptable codebook methods.

One having ordinary skill in the art will readily understand that the invention as discussed above may be practiced with steps in a different order, and/or with hardware elements in configurations which are different than those which are disclosed. Therefore, although the invention has been described based upon these preferred and non-limiting embodiments, it would be apparent to those of skill in the art that certain modifications, variations, and alternative constructions would be apparent, while remaining in the spirit and scope of the invention. Thus, the example embodiments do not limit the invention to the particular listed devices and technologies. In order to determine the metes and bounds of the invention, therefore, reference should be made to the appended claims.

We claim:

1. An apparatus, comprising:
   at least one memory including computer program code; and
   at least one processor,
   wherein the at least one memory and the computer program code are configured to, with the at least one processor, cause the apparatus at least to:
      receive an indication of a set of codeword groups to be included in a codebook;
      select a precoding matrix index based on the indicated set of codeword groups in the codebook; and
      transmit the precoding matrix index to a network node, wherein at least one codeword group of the set of codeword groups is defined for an antenna setup in a communication system, wherein the antenna setup comprises at least one of uncorrelated or diversity antenna setup, cross-polarized antenna setup, and uniform linear array antenna setup, wherein the at least one memory and the computer program code are further configured, with the at least one processor, to cause the apparatus at least to transmit the precoding matrix index to the network node to enable the network node to perform at least one of precoding, link adaptation, and single or multi-user scheduling for an antenna setup of the communication system.

2. The apparatus of claim 1, wherein the set of codeword groups comprises a plurality of codeword groups intended for uncorrelated or diversity antenna setup.

3. The apparatus of claim 1, wherein each codeword group is configured as a unitary matrix.

4. The apparatus of claim 1, wherein the at least one memory and the computer program code are configured to, with the at least one processor, cause the apparatus at least to receive the indication via one of a broadcast signaling in system information or via a dedicated radio resource control signaling.

5. A method, comprising:
receiving an indication of a set of codeword groups to be included in a codebook;
selecting a precoding matrix index based on the indicated set of codeword groups in the codebook; and
transmitting the precoding matrix index to a network node,
wherein at least one codeword group of the set of codeword groups is defined for an antenna setup in a communication system,
wherein the antenna setup comprises at least one of uncorrelated or diversity antenna setup, cross-polarized antenna setup, and uniform linear array antenna setup,
wherein the transmitting the precoding matrix comprises transmitting the precoding matrix index to the network node to enable the network node to perform at least one of precoding, link adaptation, and single or multi-user scheduling for an antenna setup of the communication system.

6. The method of claim 5, wherein the receiving the indication comprises receiving the indication comprising at least one codeword group being defined for an antenna setup in the communication system.

7. The method of claim 5, wherein the receiving the indication comprises receiving the indication via one of a broadcast signaling in system information or via a dedicated radio resource control signaling.

8. An apparatus, comprising:
at least one memory including computer program code; and
at least one processor,
wherein the at least one memory and the computer program code are configured to, with the at least one processor, cause the apparatus at least to:
generate an indication of a set of codeword groups to be included in a codebook;
transmit the indication of the set of codeword groups to be included in the codebook to a node; and
receive a precoding matrix index from the node based on the indicated set of codeword groups in the codebook,
wherein at least one codeword group of the set of codeword groups is defined for an antenna setup in a communication system,
wherein the antenna setup comprises at least one of uncorrelated or diversity antenna setup, cross-polarized antenna setup, and uniform linear array antenna setup; and
perform, based on the precoding matrix index, at least one of precoding, link adaptation, and single or multi-user scheduling for an antenna setup of the communication system.

9. The apparatus of claim 8, wherein the set of codeword groups comprises a plurality of codeword groups intended for uncorrelated or diversity antenna setup.

10. The apparatus of claim 8, wherein each codeword group is configured as a unitary matrix.

11. The apparatus of claim 8, wherein the at least one memory and the computer program code are configured to, with the at least one processor, cause the apparatus at least to transmit the indication of the set of codeword groups to be included in the codebook via one of a broadcast signaling in system information or via a dedicated radio resource control signaling.

12. A method, comprising:
generating an indication of a set of codeword groups to be included in a codebook;
transmitting the indication of the set of codeword groups to be included in the codebook to a node; and
receiving a precoding matrix index from the node based on the indicated set of codeword groups in the codebook,
wherein at least one codeword group of the set of codeword groups is defined for an antenna setup in a communication system,
wherein the antenna setup comprises at least one of uncorrelated or diversity antenna setup, cross-polarized antenna setup, and uniform linear array antenna setup; and
performing, based on the precoding matrix index, at least one of precoding, link adaptation, and single or multi-user scheduling for an antenna setup of the communication system.

13. The method of claim 12, wherein the generating the indication comprises generating the set of codeword groups, wherein at least one codeword group is defined for an antenna setup in the communication system.

14. The method of claim 12, wherein the transmitting the indication comprises transmitting the indication via one of a broadcast signaling in system information or via a dedicated radio resource control signaling.

15. A non-transitory computer readable storage medium storing instructions which, when executed by a processor, cause the processor to perform a process, the process comprising:
receiving an indication of a set of codeword groups to be included in a codebook;
selecting a precoding matrix index based on the indicated set of codeword groups in the codebook; and
transmitting the precoding matrix index to a network node,
wherein at least one codeword group of the set of codeword groups is defined for an antenna setup in a communication system,
wherein the antenna setup comprises at least one of uncorrelated or diversity antenna setup, cross-polarized antenna setup, and uniform linear array antenna setup; and
wherein the transmitting the precoding matrix comprises transmitting the precoding matrix index to the network node to enable the network node to perform at least one of precoding, link adaptation, and single or multi-user scheduling for an antenna setup of the communication system.

16. A non-transitory computer readable storage medium storing instructions which, when executed by a processor, cause the processor to perform a process, the process comprising:
generating an indication of a set of codeword groups to be included in a codebook;
transmitting the indication of the set of codeword groups to be included in the codebook to a node; and
receiving a precoding matrix index from the node based on the indicated set of codeword groups in the codebook,
wherein at least one codeword group of the set of codeword groups is defined for an antenna setup in a communication system,
wherein the antenna setup comprises at least one of uncorrelated or diversity antenna setup, cross-polarized antenna setup, and uniform linear array antenna setup; and
performing, based on the precoding matrix index, at least one of precoding, link adaptation, and single or multi-user scheduling for an antenna setup of the communication system.

* * * * *